United States Patent [19]

Ichida et al.

[11] Patent Number: 5,385,406
[45] Date of Patent: Jan. 31, 1995

[54] LINEAR MOTION ROLLING GUIDE UNIT

[75] Inventors: Tomohiro Ichida, Gifu; Takehiko Hara, Kanagawa, both of Japan

[73] Assignee: Nippon Thompson Co., Ltd., Tokyo, Japan

[21] Appl. No.: 139,105

[22] Filed: Oct. 20, 1993

[30] Foreign Application Priority Data

Oct. 22, 1992 [JP] Japan ............................. 4-079427[U]

[51] Int. Cl.⁶ .......................................... F16C 29/06
[52] U.S. Cl. .................................................. 384/45
[58] Field of Search ............................. 384/43, 44, 45

[56] References Cited

U.S. PATENT DOCUMENTS

| | | | |
|---|---|---|---|
| 4,854,741 | 8/1989 | Mottate et al. | 384/45 |
| 4,932,279 | 6/1990 | Kasuga | 384/45 X |
| 4,934,834 | 6/1990 | Morita | 384/45 |

*Primary Examiner*—Thomas R. Hannon
*Attorney, Agent, or Firm*—Sughrue, Mion, Zinn, Macpeak & Seas

[57] ABSTRACT

A linear motion rolling guide unit equipped with a long slider composed of a coupling of a plurality of casings obtains an increase in the rated load while setting the total length of the slider to a suitable length to match the machine tool in which it is to be incorporated, while also maintaining a smooth sliding state at all times even if the casings shift out of position. These advantages are obtained by juxtapositioning a spacer between each casing, and making rolling element guide track grooves provided in said spacer larger than load bearing track grooves formed in each casing to allow the rolling element guide track grooves to act as reliefs for rolling elements.

6 Claims, 9 Drawing Sheets

LINEAR MOTION ROLLING GUIDE UNIT

BACKGROUND OF THE INVENTION

1. Field of the Invention

The present invention relates to a linear motion rolling guide unit that linearly guides a movable element to be moved in a linear motion mechanism such as a machine tool or industrial robot.

2. Description of the Prior Art

Figure 1:
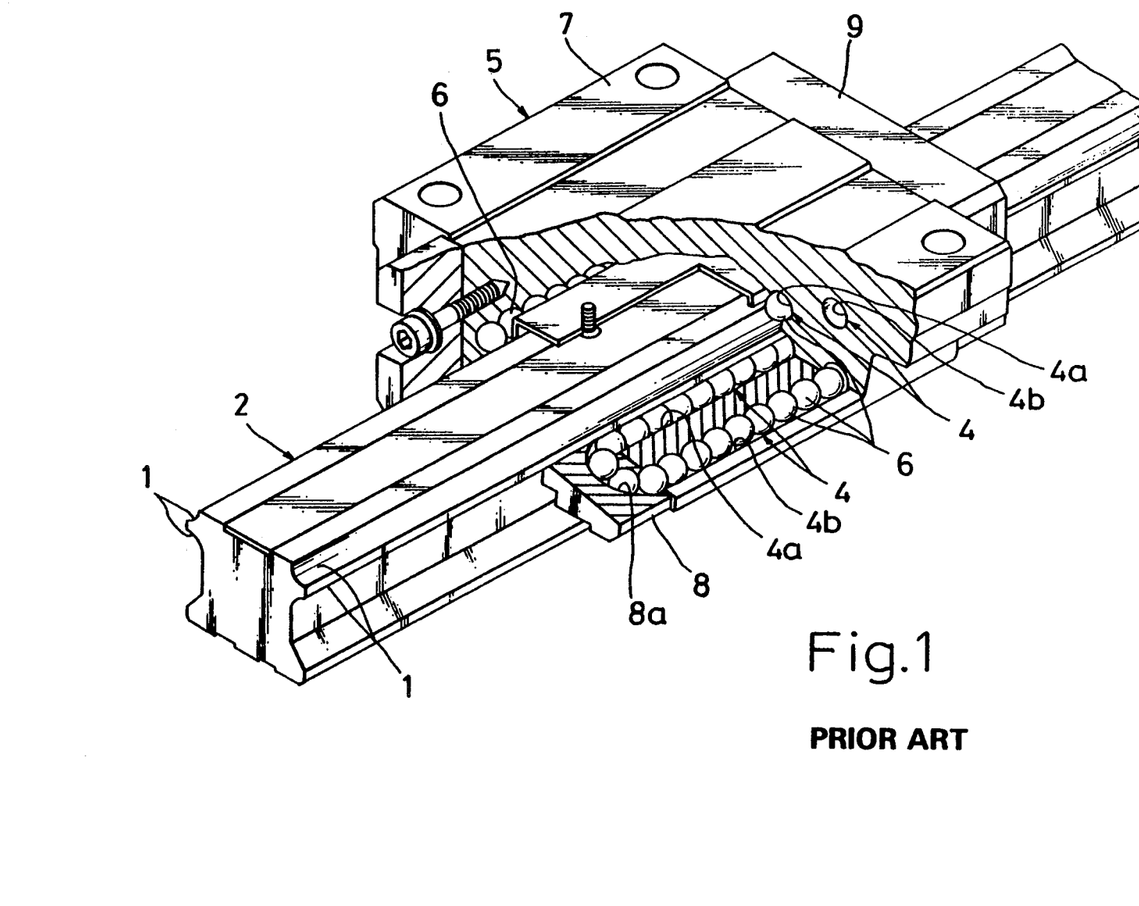
FIG. 1 is a perspective view, containing a partial cross-section, of the essential portion of the linear motion rolling guide unit of the prior art.

A typical example of this type of linear motion rolling guide unit of the prior art is shown in FIG. 1.

As shown in the drawing, this linear motion rolling guide unit has track rail 2, in which track surfaces 1 are formed along the lengthwise direction, and a slider in the form of sliding unit 5 able to move relative to track rail 2, and having rolling element circulating path 4, which contains load bearing track grooves 4a corresponding to track surfaces 1 and return paths 4b parallel with said load bearing track grooves 4a. A plurality of rolling elements in the form of balls 6 are arranged and contained within said rolling element circulating path 4, which bear the load by circulating while rolling over track surfaces 1.

More specifically, the above-mentioned sliding unit 6 has casing 7, in which the above-mentioned load bearing a track grooves 4a and return paths 4b are formed, and end caps 8 and 9 fastened to both the front and back ends of said casing 7. Furthermore, direction changing paths 8a, which connect the above-mentioned load bearing track grooves 4a and return paths 4b and serve to change the direction of balls 6, are formed in said end caps 8 and 9 (the direction changing path formed in end cap 9 is not shown).

The linear motion rolling guide device having the constitution described above is, for example, arranged on the bed of a machine tool (not shown), and track rail 2 is fastened to said bed with bolts. A table for supporting workpieces and so forth is then bolted to sliding unit 5, with this operating as the movable side.

The linear motion rolling guide unit having the above-mentioned constitution is normally used by applying preliminary pressure by a device not shown to the balls 6 that roll over the load bearing region to prevent sliding unit 5 from rattling. As a result, said linear motion rolling guide unit of the prior art had the disadvantage of sliding unit 5 slightly oscillating in all directions in the manner of demonstrating a so-called weaving phenomenon when balls 6 either entered the load bearing region or left the load bearing region.

In addition, in guide units having a relatively long sliding distance, it is extremely difficult to obtain a highly precise degree of parallelism during travel at low cost.

Figure 2:
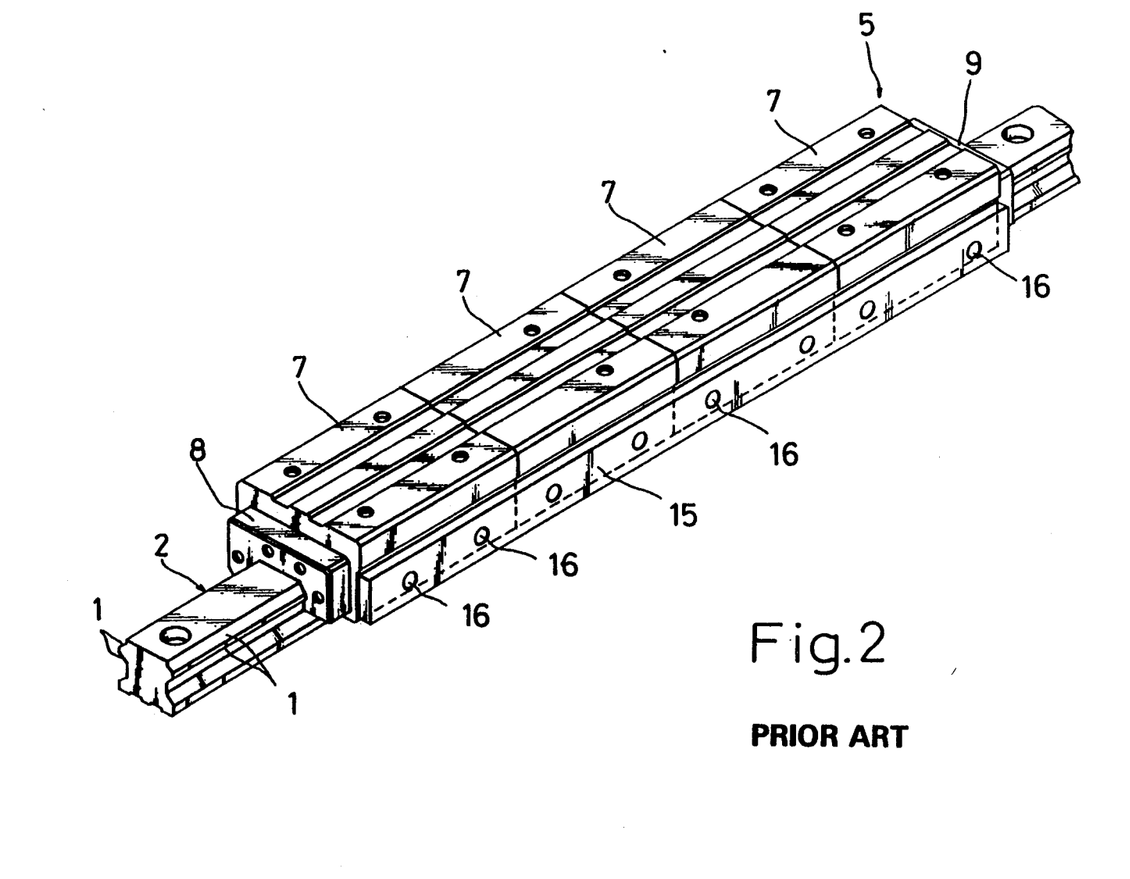
FIG. 2 is a perspective of the essential portion of the linear motion rolling guide unit of the prior art.
Figure 3:
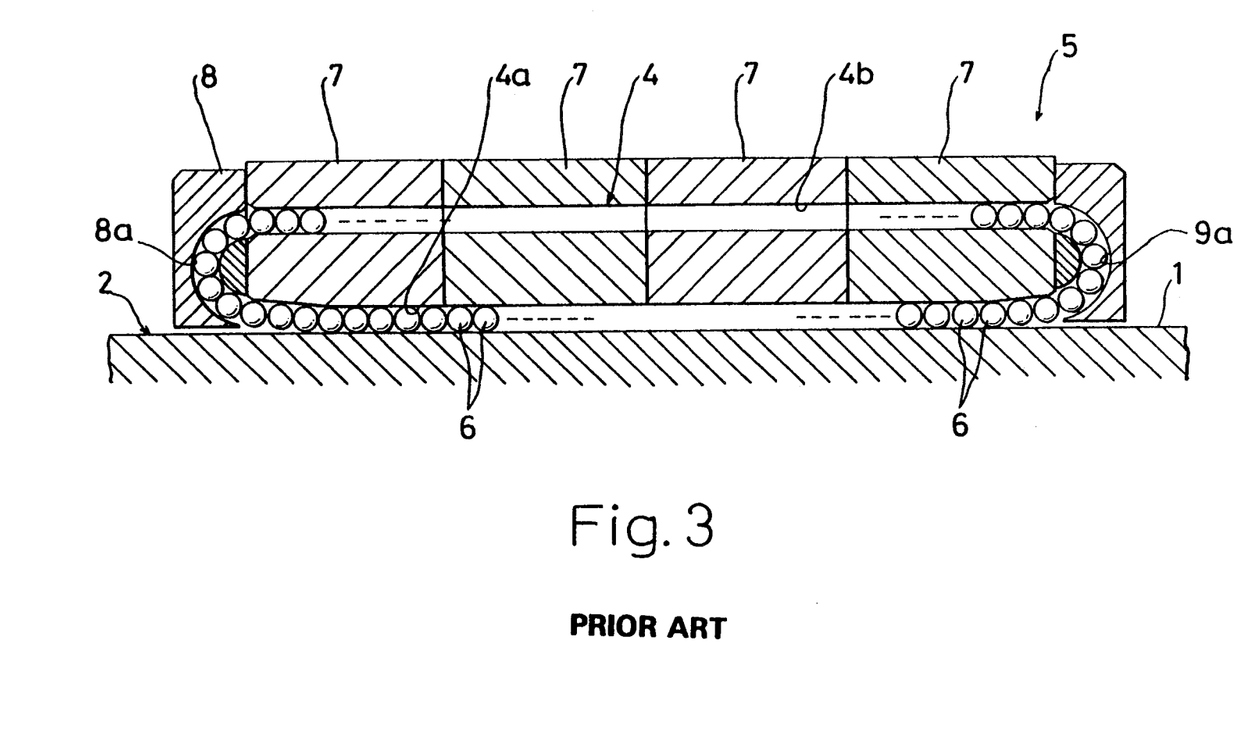
FIG. 3 is a front view, including a partial cross-section, of the essential portion of the linear motion rolling guide unit shown in FIG. 2.

Therefore, in order to solve these problems, a linear motion rolling guide unit is proposed like that shown in FIGS. 2 and 3. The same reference numerals are used for those constituent members that are either identical or correspond to the constituent members of the linear motion rolling guide unit shown in FIG. 1.

As shown in the drawings, in this linear motion rolling guide unit, sliding unit 5 has, for example, four casings 7 arranged in a row in the lengthwise direction of track rail 2, end caps 8 and 9 arranged on both ends, coupling members 15 provided to extend along the sides of each of said casings 7, and bolts 16 that fasten said coupling members 15 to each of casings 7, with the overall structure being formed to have a long shape.

Furthermore, as shown in FIG. 3, load bearing track grooves 4a and return paths 4b are formed in each casing 7.

According to the linear motion rolling guide unit described above, by coupling a plurality of casings 7 in a row to compose a long sliding unit 5, stability can be improved by increasing the number of balls 6. Consequently, in addition to it being possible to prevent weaving of sliding unit 5, it is also possible to achieve a highly precise degree of parallelism during travel at low cost. In addition, the rated load is also increased.

Despite this, in the above-mentioned linear motion rolling guide unit, although the number of casings 7 must be increased in order to increase the rated load, since the length of each casing 7 in terms of a component are formed equally, said linear motion rolling guide unit has the disadvantage of it being difficult to suitably set the total length of sliding unit 5 to match a machine tool and so forth in which said linear motion rolling guide unit is to be incorporated.

In addition, in the above-mentioned linear motion rolling guide unit, since there is the possibility of the load bearing track grooves shifting out of position at the joints of each casing 7, said linear motion rolling guide unit has the additional disadvantage of increased sliding resistance due to the circulation of balls 6 not being smooth in such case.

In addition, as the length of the load bearing track grooves becomes longer, aggregation and dispersion phenomena occur at locations where balls 6 are subjected to an unbalanced load of the load bearing track grooves when an unbalanced load is applied to sliding unit 5, thus resulting in an increase in sliding resistance.

SUMMARY OF THE INVENTION

In consideration of the disadvantages of the prior art described above, the object of the present invention is to provide a linear motion rolling guide unit equipped with the long sliding unit described above that is able to obtain an increase in the rated load while setting the total length of said sliding unit to a suitable length to match the machine tool and so forth in which it is incorporated, while also being able to maintain a smooth sliding state at all times.

The present invention composes a linear motion rolling guide unit having a track rail in which tracks are formed in the lengthwise direction, a slider able to move relative to said track rail having a rolling element circulating path containing a load bearing track that corresponds to said track, and a plurality of rolling elements arranged and contained in said rolling element circulating path that bear the load by circulating while rolling over said track; wherein, said slider has a plurality of casings arranged in a row in said lengthwise direction in which said load bearing tracks are formed as well as a spacer juxtapositioned between each casing in which rolling element guide track grooves connecting said load bearing tracks are formed, and said rolling element guide track grooves formed in said spacer are slightly larger than the load bearing tracks formed in said casings.

DESCRIPTION OF THE PREFERRED EMBODIMENTS

The following provides an explanation of the linear motion rolling guide unit as an embodiment of the present invention with reference to the attached drawings.

Figure 4:
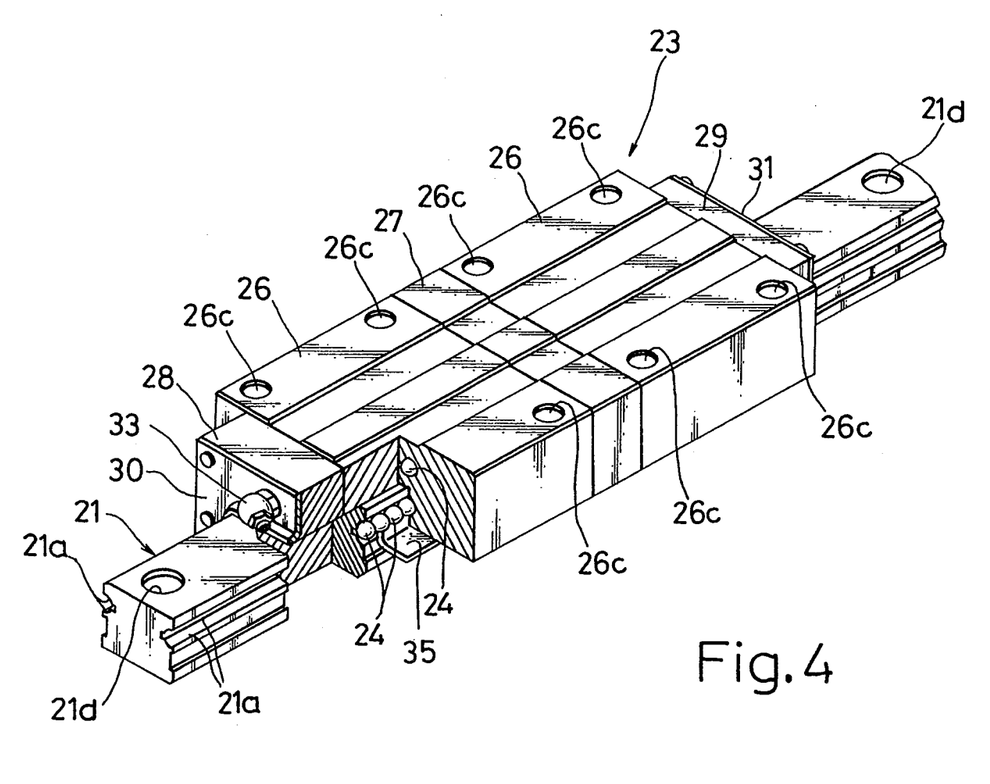
FIG. 4 is a perspective view, including a partial cross-section, of the essential portion of the linear motion rolling guide unit as an embodiment of the present invention.
Figure 5:
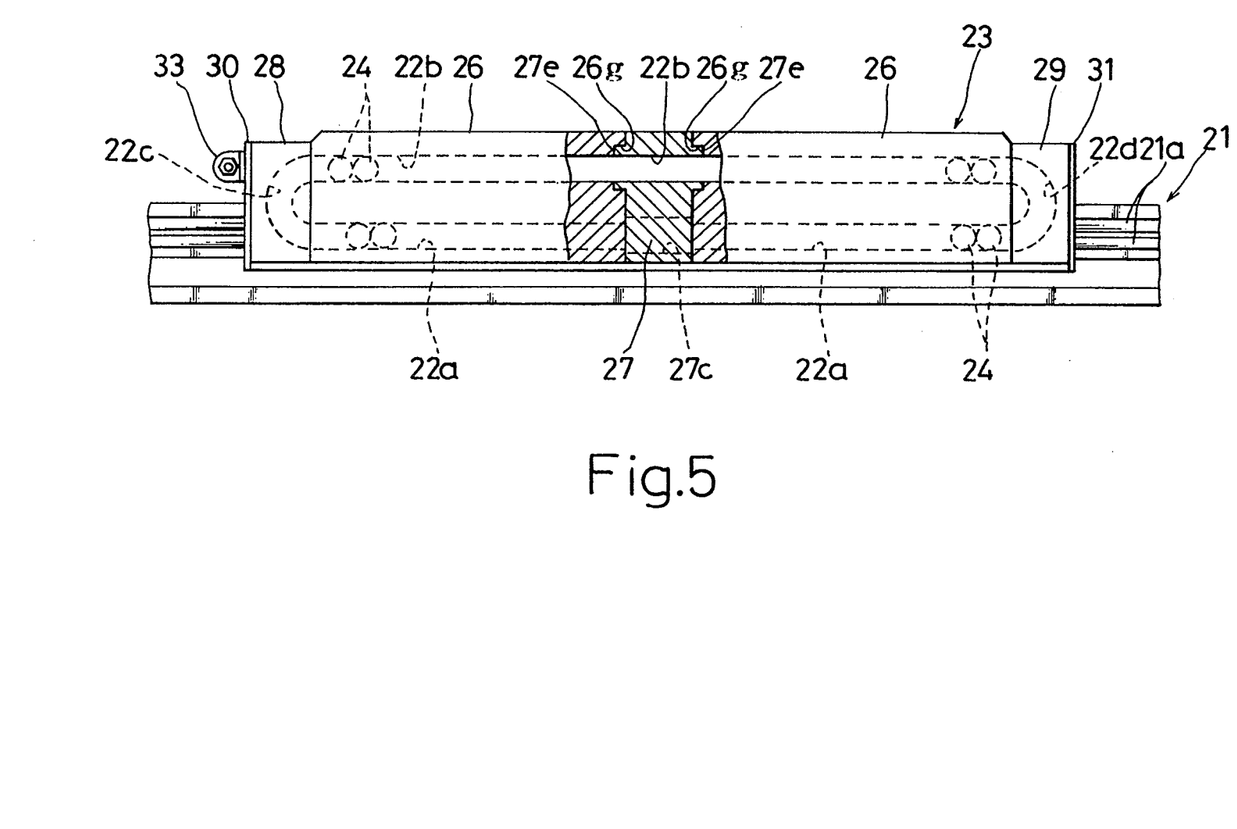
FIG. 5 is a front view, including a partial cross-section, of the essential portion of the linear motion rolling guide unit shown in FIG. 4.
Figure 6:
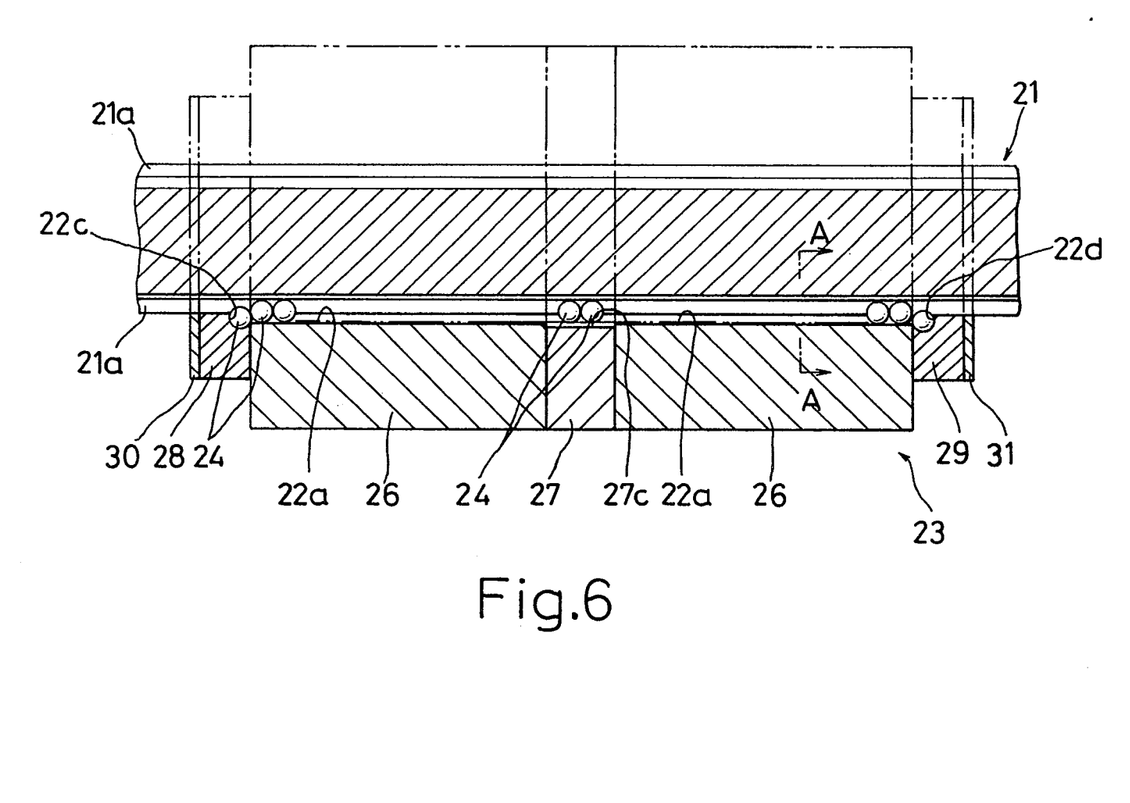
FIG. 6 is a top view, including a partial cross-section, of the essential portion of the linear motion rolling guide unit shown in FIGS. 4 and 5.

As shown in FIGS. 4 through 6, said linear motion rolling guide unit has track rail 21, in which tracks in the form of track grooves 21a, having roughly semi-circular shaped cross-sections, are each formed along the lengthwise direction on both the right and left sides, a slider in the form of the sliding unit 23 able to move relative to track rail 21 and having rolling element circulating path 22 (to be later described in detail), and a plurality of rolling elements in the form of balls 24 arranged and contained in said rolling element circulating path 22, that bear the load between track rail 21 and sliding unit 23 by circulating while rolling over said track grooves 21a accompanying movement of sliding unit 23. Furthermore, said track grooves 21a and rolling element circulating path 22 are set slightly larger than the diameter of balls 24 that pass through.

Sliding unit 23 has, for example, two casings 26 arranged in a row in the lengthwise direction of track rail 21 that are each formed to the same shape and equal dimensions, spacer 27 juxtapositioned between each casing 26, end caps 28 and 29 arranged on both ends and fastened to each casing 26, and two seals 30 and 31 attached to the outside surfaces of said end caps 28 and 29. Furthermore, grease nipple 33 for supplying grease to the balls 24 is mounted on end caps.

Since spacer 27 is juxtapositioned between each casing 26 in this manner, by suitably prescribing the length of spacer 27, the rated load can be increased while setting the total length of sliding unit 23 to a suitable length as necessary to match the machine tool and so forth into which said linear motion rolling guide unit is to be incorporated.

As shown in FIG. 5, the above-mentioned rolling element circulating path 22 is composed of load bearing tracks in the form of load bearing track grooves 22a and return paths 22b formed mutually in parallel to linearly pass through each casing 26, and a pair of roughly semi-circular shaped direction changing paths 22c and 22d formed in both end caps 28 and 29 that connect said load bearing track grooves 22a and return paths 22b at both their ends. Furthermore, said load bearing track grooves 22a correspond to track grooves 21a of track rail 21.

The following provides an explanation of the constitution of each of casings 26, 26 and spacer 27.

Figure 7:
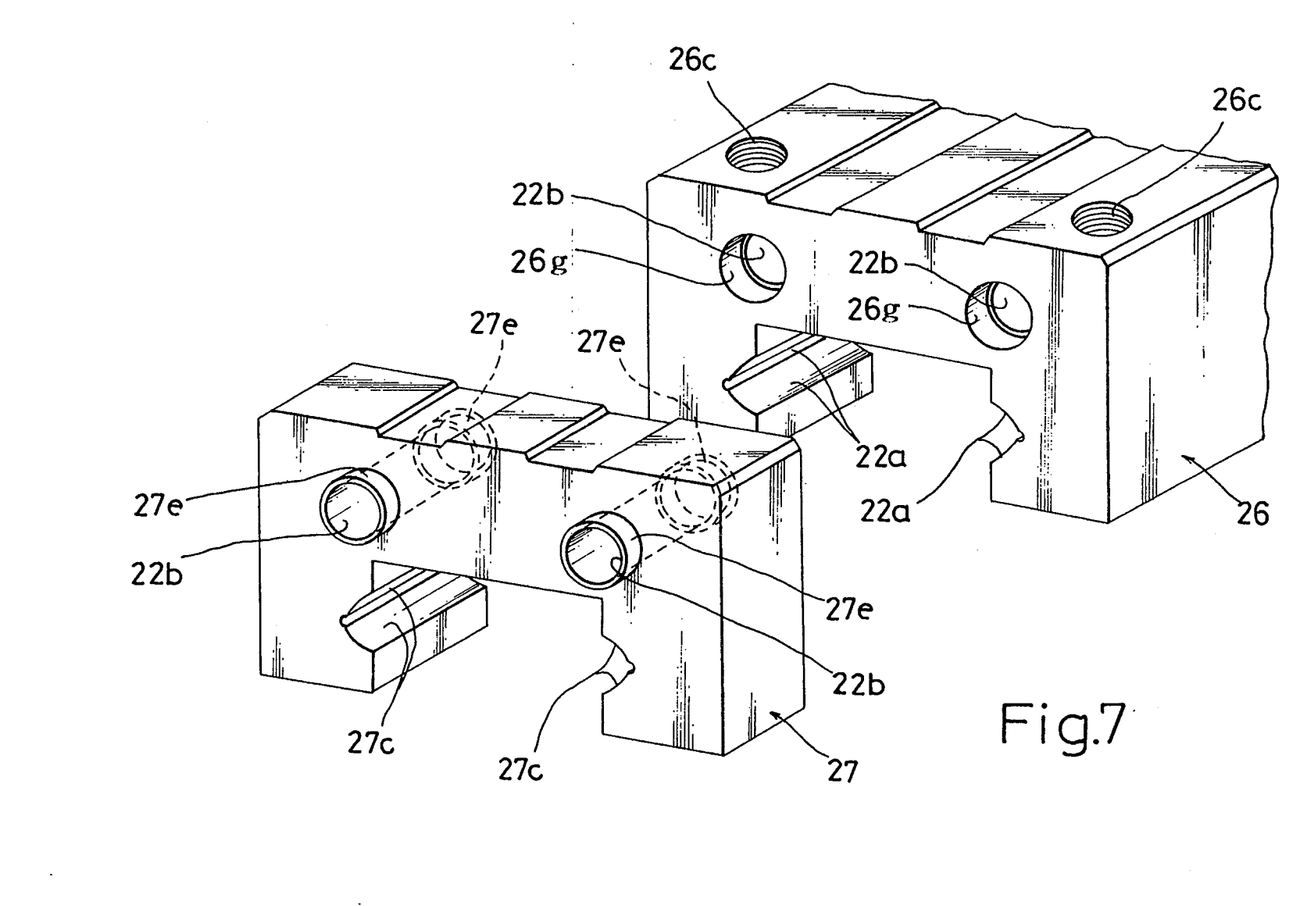
FIG. 7 is a perspective view of the spacer and casing equipped on the linear motion rolling guide unit shown in FIGS. 4 through 6.
Figure 8:
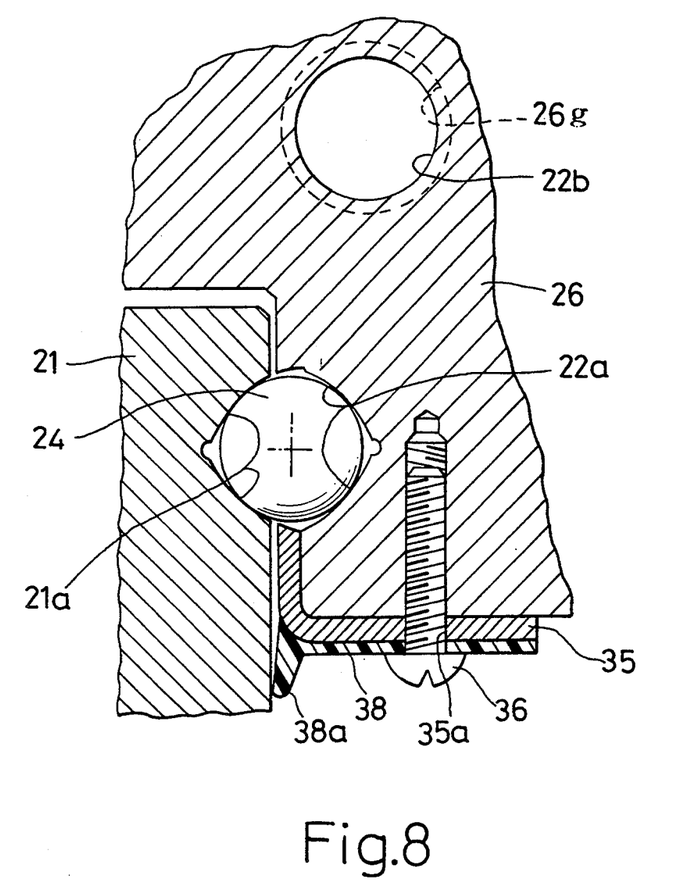
FIG. 8 is a cross-sectional view taken along line A—A relating to FIG. 6.

Each of casings 26, 26 and spacer 27 are each shaped roughly into a rectangular parallelepiped overall. The above-mentioned load bearing track grooves 22a and return paths 22b are formed in each of casings 26, 26. In addition, rolling element guide track grooves 27c that connect return paths 22b and said load bearing track grooves 22a are formed in spacer 27. The shape and dimensions of the vertical cross-sections of casings 26, 26 and spacer 27 with respect to the lengthwise direction of track rail 21 are either identical or roughly identical. According to said constitution, casings 26 and spacer 27 are able to appear as a single unit thus making said constitution esthetically preferable. Furthermore, FIG. 7 shows a perspective view of casing 26 and spacer 27. In addition, FIG. 8 shows the view taken along line A—A with respect to FIG. 6.

In the above constitution, rolling element guide track grooves 27c, formed in spacer 27 to allow passage of balls 24, are set slightly larger than load bearing track grooves 22a formed in casings 26, 26. According to said constitution, the circulation of balls 24 from the first casing 26 to spacer 27, and then from spacer 27 to the next casing 26 is able to obtain a smooth sliding state at all times even if each of the load bearing track grooves 22a shift out of position between a plurality of casings 26 arranged in a row. In addition, even in cases when aggregation and dispersion phenomena occur in balls 24 at a portion of load bearing track grooves 22a due to the application of an unbalanced load to sliding unit 23, since rolling element guide track grooves 27c of spacer 27 act as reliefs for balls 24, sliding resistance does not increase and constant sliding performance is maintained.

Furthermore, spacer 27 is preferably made of synthetic resin. Since rolling element guide track grooves 27c equipped in said spacer 27 as described above are larger than the diameter of balls 24, even if balls 24 attempt to float inside said rolling element guide track grooves 27c, the level of noise that is produced can be held to a low level by the cushioning action of said synthetic resin.

The following provides an explanation of the coupling device that couples casings 26 and spacer 27 together.

Figure 9:
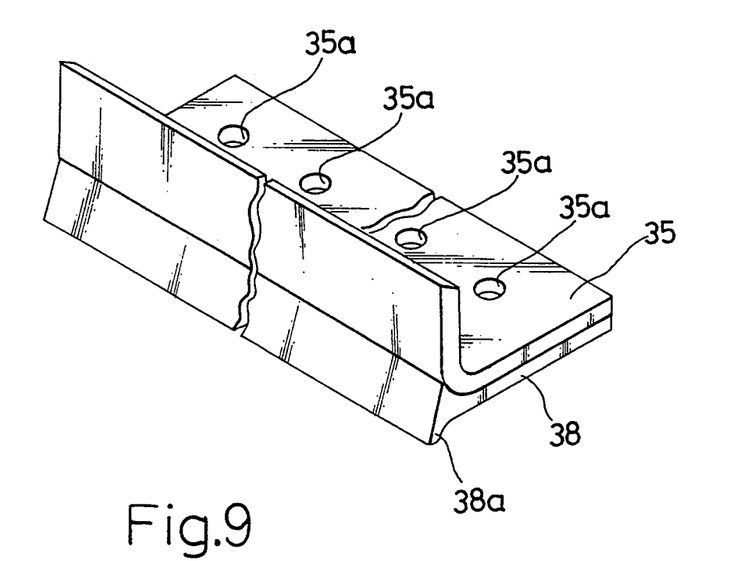
FIG. 9 is a perspective view of the retaining member equipped on the linear motion rolling guide unit shown in FIGS. 4 through 6.

As shown in FIGS. 4 and 8, a pair of long retaining members 35 are provided to extend along the right and left bottom portions of casings 26, 26 and spacer 27 (only one retaining member is shown in the drawings). These retaining members retain balls 24 so that they do not fall out of load bearing track grooves 22a and rolling element guide track grooves 27c when sliding unit 23 is removed from track rail 21. As is particularly clear from FIG. 9, retaining members 35 have a plurality of threaded insertion holes 35a and are formed so that their cross-sections are L-shaped. As shown in FIG. 8, casings 26, 26 and spacer 27 are fastened to said retaining members 35 by screws 36 inserted into these threaded insertion holes 35a. Casings 26 and spacer 27 are thus coupled together in the lengthwise direction of track rail 21 by these retaining members 35. Furthermore, a constitution may also be employed in which retaining members 35 are not fastened to spacer 27.

Thus, by using retaining members 35, which prevent balls 24 from falling out, in the form of a lower fastening plate that couples casings 26 and spacer 27, there is no need to separately provide a fastening plate specifically for coupling, thus minimizing the number of parts required. Furthermore, a fastening plate specifically for coupling may be provided separately.

As shown in the drawings, bottom seals 38, made of rubber and so forth, are provided on the lower surfaces of retaining members 35. Tongue pieces 38a, formed on one end of said bottom seals 38, making sliding contact with the side surface of track rail 21, thus providing sealing action between said track rail 1, casings 26, 26 and spacer 27.

The above coupling device also includes the constitution described below in addition to the above-mentioned retaining members 35.

As shown in FIGS. 5 and 7, cylindrical projections 27e are protruding around return paths 22b on the front and back ends of spacer 27. Said projections 27e tightly engage with concave portions in the form of countersunk portions 26g formed in casings 26.

Casings 26 and spacer 27 are relatively positioned in all directions with respect to the lengthwise direction of track rail 21 by these concave portions and projections, thus preventing them from mutually shifting. Furthermore, although concave portions are formed in casings 26 and projections are formed on spacer 27 in the present embodiment, conversely, projections may be formed on casings 26 and concave portions may be formed in spacer 27.

The linear motion rolling guide unit having the above-mentioned constitution is arranged on the bed of, for example, a machine tool (not shown), and track rail 21 is fastened with bolts to said bed. A table and so forth for holding a workpiece (not shown) is bolted to sliding unit 23, and this operates as the moving side. Furthermore, as shown in FIG. 4, a plurality of bolt insertion holes 21d are formed in track rail 21 in which bolts (not shown) are inserted for fastening to the above-mentioned bed. In addition, a plurality of threaded holes 26c (refer to FIGS. 4 and 7) are formed in the upper surface of each casing 26 that comprises sliding unit 23. The above-mentioned table is then fastened to sliding unit 23 by bolts (not shown) that screw into these threaded holes 26c.

Furthermore, although balls are used for the rolling elements in the above-mentioned embodiment, a constitution may also be employed in which rollers are used.

In addition, although two casings 26 and one spacer 27 are provided in the above-mentioned embodiment, the numbers of these can be increased as necessary.

In addition, when the number of casings 26 provided is large, instead of providing a single long retaining member 35 over the entire length of sliding unit 23 for coupling each of the casing sandwiched around spacers 27, a series of short retaining members may be arranged in a row. However, in this case, a device is provided that couples these short retaining members together in order to maintain the overall sliding unit in the form of a single unit.

As explained above, in the linear motion rolling guide unit according to the present invention, a spacer is juxtapositioned between two casings that form a slider. Consequently, by suitably prescribing the length of said spacer, the present invention offers a first advantage of allowing the rated load to be increased while setting the total length of the sliding unit to a suitable length to match the machine tool and so forth in which said linear motion rolling guide unit is to be incorporated.

In addition, in the linear motion rolling guide unit according to the present invention, the advantage described below is offered by setting rolling element guide track grooves formed in said spacer for passage of rolling elements to be slightly larger than the load bearing tracks formed in the casings.

Namely, movement of the rolling elements is smooth and sliding resistance of the slider does not increase even if the load bearing tracks shift out of position to a certain extent at the joints. Moreover, even if the rolling elements demonstrate aggregation and dispersion at a portion of the load bearing tracks due to the application of an unbalanced load to the slider, since the rolling element guide track grooves of the spacers acts as reliefs for the rolling elements, sliding resistance does not increase and sliding performance is maintained constant.

What is claimed is:

1. A linear motion rolling guide unit, comprising: a track rail in which tracks are formed in the lengthwise direction, a slider movable relative to said track rail having a rolling element circulating path containing a load bearing track that corresponds to each said track, and a plurality of rolling elements arranged and contained in said rolling element circulating path that bear the load by circulating while rolling over said tracks; wherein, said slider includes a plurality of casings arranged in a row in said lengthwise direction in which said load bearing tracks are formed, and a spacer juxtapositioned between each casing in which rolling element guide track grooves connecting said load bearing tracks are formed, said rolling element guide track grooves formed in said spacer being slightly larger than the load bearing tracks formed in said casings.

2. The linear motion rolling guide unit as set forth in claim 1 wherein the shape and dimensions of the vertical cross-sections of said casings and spacer with respect to said lengthwise direction are roughly the same.

3. The linear motion rolling guide unit as set forth in claim 1 having a lower fastening plate extending along each of said casings and spacer and fastened to each of said casings that couples each of said casings and spacer in the lengthwise direction at mutual joints thereof, mutually engaging concave portions and projections formed at the joints between said casings and spacer, and said casings spacer being relatively positioned in the vertical direction with respect to said lengthwise direction by the engaging of said concave portions and projections.

4. The linear motion rolling guide unit as set forth in claim 3 wherein said fastening plate is composed of a retaining member that retains said rolling elements so that they do no fall out of said load bearing tracks and rolling element guide track grooves.

5. The linear motion rolling guide unit as set forth in claim 3 wherein said fastening plate effects sealing between said track Pail and said casings and spacer.

6. The linear motion rolling guide unit as set forth in claim 1 wherein said spacer is formed from synthetic resin.

* * * * *